United States Patent
Filippi et al.

(10) Patent No.: US 10,087,074 B2
(45) Date of Patent: Oct. 2, 2018

(54) PROCESS FOR PRODUCING AMMONIA SYNTHESIS GAS

(75) Inventors: Ermanno Filippi, Castagnola (CH); Francesco Baratto, Como (IT); Sergio Panza, Como (IT); Raffaele Ostuni, Milan (IT)

(73) Assignee: Casale SA, Lugano (CH)

(*) Notice: Subject to any disclaimer, the term of this patent is extended or adjusted under 35 U.S.C. 154(b) by 0 days.

(21) Appl. No.: 13/805,016

(22) PCT Filed: May 12, 2011

(86) PCT No.: PCT/EP2011/057729
§ 371 (c)(1),
(2), (4) Date: Dec. 18, 2012

(87) PCT Pub. No.: WO2012/004032
PCT Pub. Date: Jan. 12, 2012

(65) Prior Publication Data
US 2013/0101490 A1    Apr. 25, 2013

(30) Foreign Application Priority Data
Jul. 6, 2010 (EP) .................................. 101684959

(51) Int. Cl.
*C01B 3/02* (2006.01)
*C01B 3/38* (2006.01)
(Continued)

(52) U.S. Cl.
CPC .............. *C01B 3/025* (2013.01); *C01B 3/382* (2013.01); *C01B 3/48* (2013.01); *C01B 3/506* (2013.01);
(Continued)

(58) Field of Classification Search
CPC ...................................................... C01B 3/025
See application file for complete search history.

(56) References Cited

U.S. PATENT DOCUMENTS 3,397,962 A * 8/1968 Squires ...................... B01J 8/06
                                                                252/373
4,296,085 A * 10/1981 Banquy ........................ 423/359
(Continued)

FOREIGN PATENT DOCUMENTS

CH    2064337 A1 *  3/2009
CH    2172417 A1 *  7/2010
(Continued)

OTHER PUBLICATIONS

From Science to Proven Technology—Development of new Topsoe Prereforming Catalyst AR-401 Nitrogen and Syngas 2007 Conference, Feb. 2007 Brian Munch et al. pp. 1-11.*
(Continued)

*Primary Examiner* — Douglas B Call
(74) *Attorney, Agent, or Firm* — Akerman LLP

(57) ABSTRACT

A process for producing ammonia synthesis gas from a hydrocarbon-containing feedstock, with steps of primary reforming, secondary reforming with an oxidant stream, and further treatment of the synthesis gas including shift, removal of carbon dioxide and methanation, wherein the synthesis gas delivered by secondary reforming is subject to a medium-temperature shift (MTS) at a temperature between 200 and 350° C., and primary reforming is operated with a steam-to-carbon ratio lower than 2. A corresponding method for revamping an ammonia plant is disclosed, where an existing HTS reactor is modified to operate at medium temperature, or replaced with a new MTS reactor, and the steam-to-carbon ratio in the primary reformer is lowered to a value in the range 1-5–2, thus reducing inert steam in the flow rate trough the equipments of the front-end.

7 Claims, 1 Drawing Sheet

(51) Int. Cl.
*C01B 3/48* (2006.01)
*C01B 3/50* (2006.01)
*C01B 3/56* (2006.01)

(52) U.S. Cl.
CPC ........ *C01B 3/56* (2013.01); *C01B 2203/0233* (2013.01); *C01B 2203/0244* (2013.01); *C01B 2203/0283* (2013.01); *C01B 2203/0288* (2013.01); *C01B 2203/043* (2013.01); *C01B 2203/046* (2013.01); *C01B 2203/0445* (2013.01); *C01B 2203/0475* (2013.01); *C01B 2203/068* (2013.01); *C01B 2203/0883* (2013.01); *C01B 2203/1235* (2013.01); *C01B 2203/141* (2013.01); *C01B 2203/143* (2013.01); *C01B 2203/146* (2013.01)

(56) References Cited

U.S. PATENT DOCUMENTS

| | | | |
|---|---|---|---|
| 4,695,442 A * | 9/1987 | Pinto et al. | 423/359 |
| 4,778,670 A | 10/1988 | Pinto | |
| 4,910,007 A | 3/1990 | Pinto et al. | |
| 4,981,669 A * | 1/1991 | Pinto | 423/359 |
| 5,068,058 A * | 11/1991 | Bushinsky | C01B 3/025 |
| | | | 252/373 |
| 5,202,057 A * | 4/1993 | Nicholas | C01B 3/025 |
| | | | 252/376 |
| 6,048,472 A * | 4/2000 | Nataraj | C01B 3/36 |
| | | | 252/373 |
| 6,216,464 B1 * | 4/2001 | Andersen | C01B 3/025 |
| | | | 60/645 |
| 6,340,382 B1 * | 1/2002 | Baksh et al. | 95/96 |
| 2006/0188435 A1 | 8/2006 | Herb et al. | |
| 2009/0184293 A1 | 7/2009 | Han | |
| 2009/0232729 A1 * | 9/2009 | Genkin | C01B 3/384 |
| | | | 423/651 |
| 2010/0303703 A1 * | 12/2010 | Filippi | C01B 3/025 |
| | | | 423/359 |
| 2011/0042621 A1 * | 2/2011 | Price | 252/373 |
| 2011/0206594 A1 * | 8/2011 | Singh | C01B 3/025 |
| | | | 423/361 |
| 2013/0000320 A1 * | 1/2013 | McKenna et al. | 60/780 |

FOREIGN PATENT DOCUMENTS

| | | |
|---|---|---|
| EP | 1690826 A2 | 8/2006 |
| EP | 2065337 A1 | 6/2009 |
| EP | 2172417 A1 | 4/2010 |
| WO | 02/48027 A1 | 6/2002 |
| WO | WO2009/068159 * | 6/2009 |
| WO | WO2010/037598 * | 4/2010 |
| WO | WO 2011/077107 * | 6/2011 |

OTHER PUBLICATIONS

Steam Reforming for Hydrogen. The Process and the Mechanism Fuel Chemistry Division Preprints, 2003, vol. 48, issue 1, pp. 218-219 Jens R. Rostrup-Nielsen et al.*

Developments in Autothermal Reforming Thomas S. Christensen, et al. Studies in Surface Science and Catalysis vol. 119, pp. 883-888, 1998.*

Technologies for large-scale gas conversion K. Aasberg-Petersen et al. Applied Catalysis A: General vol. 221, pp. 379-387, 2001.*

International Search Report issued in connection with PCT/EP2011/057729.

International Preliminary Report on Patentability issued in connection with PCT/EP2011/057729.

Duker, Axel et al., "Catalytic Technology: Options for better hydrogen production", Hydrocarbon Processing, Feb. 4, 2010, pp. 1-7.

Nielsen, Anders et al., "Ammonia, Catalysis and Manufacture", Berlin: Springer-Verlag, 1005.

Bhakta, Makund et al., "Techniques for Increasing Capacity and Efficiency of Ammonia Plants", Ammonia Plant and Related Facilities Safety, vol. 38, 1998, pp. 185-196.

* cited by examiner

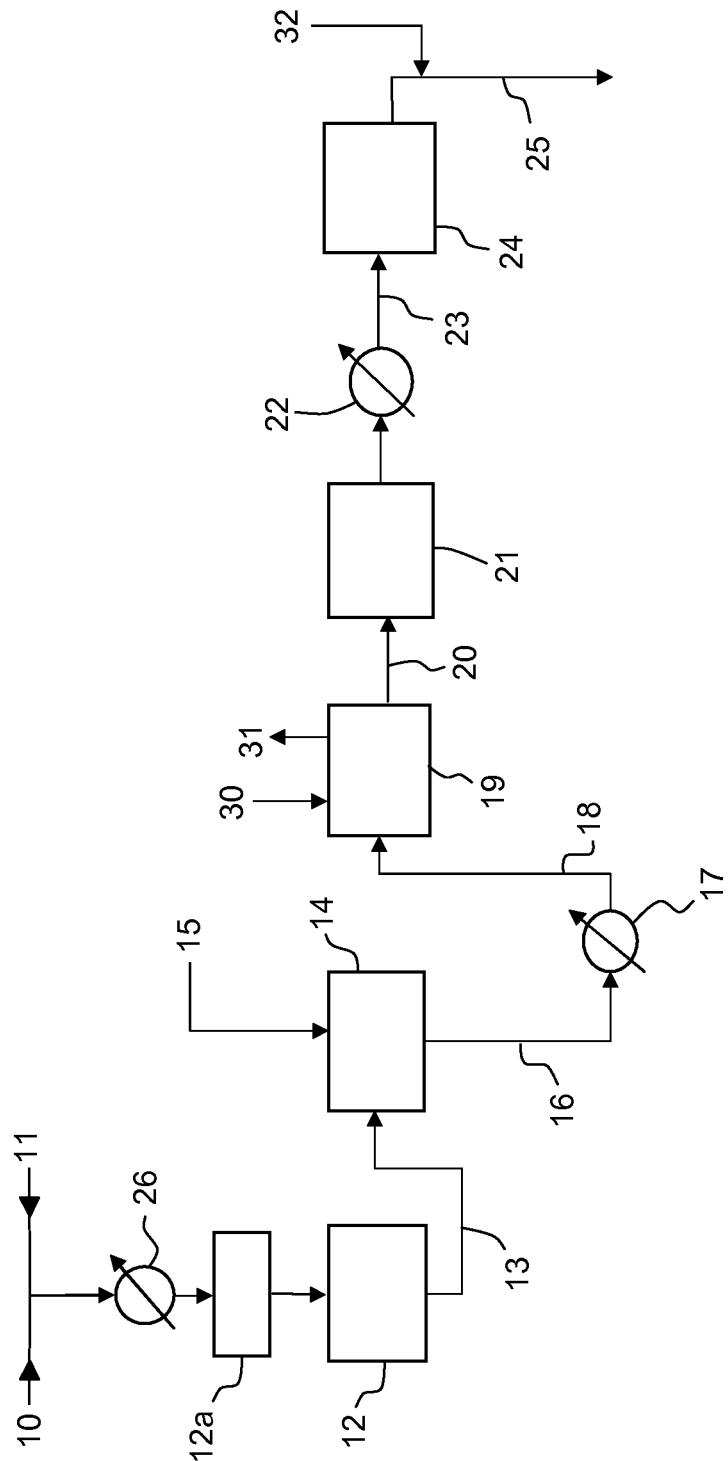

PROCESS FOR PRODUCING AMMONIA SYNTHESIS GAS

This application is a national phase of PCT/EP2011/057729, filed May 12, 2011, and claims priority to EP 10168495.9, filed Jul. 6, 2010, the entire contents of both of which are hereby incorporated by reference.

FIELD OF THE INVENTION

The invention relates to reforming of hydrocarbons for the preparation of a synthesis gas, also named syngas, for the production of ammonia.

PRIOR ART

The synthesis of ammonia ($NH_3$) requires a synthesis gas comprising hydrogen ($H_2$) and nitrogen ($N_2$) in a suitable ratio of about 3:1. The term ammonia syngas will be used with reference to a synthesis gas with the above composition.

It is known to produce said syngas from the reforming of a hydrocarbon (HC) feedstock containing methane. Reforming takes place in a primary reformer and then in a secondary reformer. Usually, the feedstock and a suitable amount of steam are admitted into a primary reformer, where methane is converted in a mixture of carbon monoxide, carbon dioxide and hydrogen by passage over a suitable catalyst; the secondary reformer receives the gas product delivered by the primary reformer, and an air flow. The reformed gas exiting the secondary reformer is then purified, especially to remove carbon oxides CO, $CO_2$ and residual methane, and to obtain a gas composition suitable for ammonia synthesis having a $H_2/N_2$ molar ratio (HN ratio) close to 3:1. In a typical prior-art arrangement, the gas is treated in a series of equipments including a high-temperature shift converter (HTS) usually operating at 350-500° C., a low-temperature shift converter (LTS), a $CO_2$ washing column, a methanation reactor.

U.S. Pat. No. 4,910,007 discloses a process for the production of ammonia comprising forming ammonia synthesis gas by reacting a carbonaceous feedstock with steam and a gas containing oxygen and nitrogen according to the prior art.

The primary reformer converts methane ($CH_4$) and steam ($H_2O$) into CO and $H_2$. The chemical reaction would require one mole of steam for each mole of methane. In practice, the primary reformer is always operated with a higher steam-to-carbon (SC) ratio, greater than 2.6 and usually in the range 2.8-3.5. The reason behind the choice of S/C always greater than 2.6 is that the HTS converter requires a steam-to-gas ratio greater than 0.4 to avoid over-reduction and formation of hydrocarbons by Fischer-Tropsch synthesis. A steam to gas ratio of about 0.4 in the HTS converter corresponds to SC ratio around 2.6 at the inlet of the primary reformer. Hence, the steam and methane feed which are admitted to the primary reformer must ensure an SC ratio greater or equal than said threshold value of 2.6.

The excess of steam—compared to the theoretical stoichiometric value—has the beneficial effect to right-shift the equilibrium of the conversion, i.e. to help conversion of methane. However, a large amount of steam causes the following drawbacks: excess steam causes a larger volumetric flow rate, which calls for larger and more expensive equipments; excess steam moreover is inert to the reforming and then has a negative impact on the efficiency of the reforming itself. A fraction of the heat input of the reformer is actually consumed to heat the inert steam.

SUMMARY OF THE INVENTION

The applicant has found that the steam-to-carbon ratio (S/C or SC ratio) can be changed to unexpectedly low values, namely less than 2 and preferably in a range 1.5-1.7, when the synthesis gas obtained after secondary reforming is subject to a medium-temperature shift reaction in presence of a suitable catalyst, instead of high temperature shift. Said medium temperature is in a range of 200 to 350° C. and preferably 220-310° C. and more preferably around 260-270° C. An appropriate catalyst may be a Cu—Zn catalyst.

An advantage of such low SC ratio is that the volumetric flow rate through the primary and secondary reformer is greatly reduced. On a theoretical basis, reducing the SC ratio from 3 to about 1.5 means that the gas flow rate is reduced by 60%.

Hence, an aspect of the invention is a process for producing ammonia synthesis gas from a hydrocarbon-containing feedstock, the process comprising the steps of primary reforming said hydrocarbon-containing feedstock with steam, and secondary reforming with an oxidant stream, the process being characterized in that:

the syngas produced by said secondary reforming is subject to a medium-temperature shift at a temperature between 200 and 350° C.,
and in that said primary reforming is operated with a steam-to-carbon ratio lower than 2.

It is preferred that a pre-reforming is operated before the step of primary reforming, in particular with lower SC ratios, close to 1.5. The purpose of the pre-reforming is to ensure that primary reforming takes place in presence of a certain amount of hydrogen ($H_2$), to avoid cracking of the methane.

Said oxidant stream fed to the secondary reforming may be air, $O_2$-enriched air or substantially pure oxygen. When the secondary reforming is supplied with air, an excess nitrogen in the synthesis gas, compared to the 3:1 stoichiometric ratio, is usually produced. Feeding the secondary reforming with $O_2$-enriched air or substantially pure oxygen has the advantage to reduce or avoid said excess nitrogen in the reformed gas. When appropriate, nitrogen can be supplied to the purified syngas, namely after the treatment of purification of the synthesis gas, to obtain the required HN ratio for synthesis of ammonia.

A preferred range for the SC ratio in the primary reformer is 1.5-2 and a more preferred range is 1.5-1.7.

Operation with a low SC ratio may cause the syngas to contain a certain amount of unreacted hydrocarbon, in particular unreacted $CH_4$. According to further aspects of the invention, said unreacted hydrocarbon is at least partly removed from the syngas by either:

cryogenic separation, or
a treatment step of adsorption, such as PSA for example, or
increasing the amount of the purge gas taken from the ammonia synthesis loop where the synthesis gas, produced in accordance with the invention, is reacted. Inert gases and methane can be removed from the purge gas with a known treatment, for example a cryogenic process operated substantially at the same pressure of the synthesis loop.

Said cryogenic separation may be effected to remove unreacted methane and also to remove excess nitrogen, when the secondary reforming is supplied with air. Increasing the amount of the loop purge may be preferred when oxidant to the secondary reforming is supplied as enriched air or pure oxygen.

An aspect of the invention is also an apparatus for the production of ammonia syngas, adapted to operate according to the above process.

The invention is also suitable for revamping of an existing ammonia plant, and in particular for revamping the front-end of the plant. The invention provides a method for revamping of an ammonia plant comprising a front-end for production of a ammonia synthesis gas, and a synthesis loop for reaction of said synthesis gas into ammonia, said front-end comprising at least a primary reformer a secondary reformer, a high-temperature shift reactor and a low-temperature shift reactor arranged downstream the secondary reformer, to remove carbon oxides from the ammonia syngas, the primary reformer being connected with a hydrocarbon feed and a steam feed. The method for revamping comprises at least the steps of:

replacing said HTS reactor with a medium-temperature shift reactor, or modifying the HTS reactor for operation at medium temperature, said medium temperature being in the range 200 to 350° C.;

modifying the hydrocarbon feed and steam feed to the primary reformer, so to obtain operation of said primary reformer with a steam-to-carbon ratio lower than 2 and preferably in a range 1.5 to 2.

The medium-temperature shift reactor is fitted with a suitable catalyst for operation at said medium temperature. Said reactor is preferably an isothermal reactor, comprising a heat exchanger immersed in the catalyst.

Then, the revamping may involve either:
i) keeping the existing vessel of the HTS reactor, replacing the high temperature catalyst with a medium temperature catalyst, such as Cu—Zn catalyst, and providing the vessel with an internal heat exchanger, immersed in the catalyst, or
ii) installing a new MTS reactor with a suitable catalyst and internal heat exchanger.

In both the above options, the heat exchanger is preferably a plate heat exchanger.

Preferably, a pre-reforming section is also added upstream the primary steam reformer.

According to preferred embodiments, the method may further comprise the increasing of the oxygen feed to the secondary reformer, by any of the following measures: a) feeding excess air to said secondary reformer; b) providing enrichment of air fed to the secondary reformer; c) feeding substantially pure oxygen to the secondary reformer. To achieve the aforesaid measures the revamping of the plant may provide that: a) the existing air feed to the secondary reformer is modified to provide a larger air input, or b) a suitable equipment for air enrichment is installed, or c) a suitable source of substantially pure oxygen is installed, if not available. Said steps may involve the modification or replacement of piping, valves, auxiliary equipments, etc. . . . according to known art.

According to still further embodiments, further equipments for syngas purification may be installed, to provide any of the following: cryogenic separation of excess methane and/or nitrogen in the ammonia syngas;

separation of excess nitrogen, if any, by an adsorption process such as PSA; increasing the purge loop form the synthesis loop, to provide removal of inert gases and residual methane.

As stated above, an important advantage of the inventive revamping is that, by lowering the SC ratio in the primary reformer, the overall volumetric flow rate for a given syngas production is reduced. The volumetric flow rate is limited by the size of the available equipments, including for example tubes of the primary reformer, the $CO_2$ removal system, etc. . . . By lowering the SC ratio and then the amount of inert steam in the gas delivered by the primary reformer, the method of the invention provides that the available equipments—originally designed to operate with a SC ratio close to 3—leave now a significant margin for increasing the flow rate of useful gas. In other words, the invention allows to reduce the flow rate of substantially inert steam through the reformers, heat exchangers, and other equipments of the plant.

For example, reducing the operational SC ratio from 3 to about 1.5 would allow a theoretical 60% increase of the gas flow rate. For each mole of methane supplied to the primary reformer, the total flow rate will be reduced from 4 moles to 2.5 moles. It follows that the capacity of the plant could be increased by about 60%. In practice, the provision of new or modified MTS reactor, keeping the other main items of the front-end of the ammonia plant, may provide a lower increase, the primary reformer becoming the bottleneck in terms of max. flow rate. For example, in the above example of SC ratio passing from 3 to 1.5, the actual capacity could be increased typically by about 25%.

However, a greater increase of capacity may be obtained without modifying the internals of the primary reformer if, further to provision of MTS reactor instead of the original HTS reactor, one or more of the following measures are taken:

providing more oxygen to the primary reformer, by feeding excess air or enriched air or pure oxygen to said primary reformer, improving the purification of the syngas by one or more of the techniques listed above, i.e. cryogenic separation of excess methane and/or nitrogen in the ammonia syngas; separation of excess nitrogen by means of adsorption; increasing the purge of the synthesis loop.

Hence, the revamping method may include, when necessary, the installation of the related equipments, such as air separation unit for air enrichment or oxygen feed, cryogenic separator, PSA separation section. The method may include also the revamping of the syngas main compressor, synthesis reactor, and other equipments, to process the augmented flow rate of syngas delivered by the front-end.

It should also be noted that the syngas flow delivered by the revamped front end may contain less nitrogen than required to react the stoichiometric ratio 3:1 for synthesis of $NH_3$. In this case, the missing nitrogen may be furnished as a separate stream, which is added to the syngas preferably at suction side or delivery side of the main syngas compressor. Said nitrogen stream could be generated by an air separation unit.

BRIEF DESCRIPTION OF THE FIGURES

FIG. 1 is a block diagram of the front-end of an ammonia synthesis plant, according to the invention.

DETAILED DESCRIPTION OF A PREFERRED EMBODIMENT

Referring to FIG. 1, a hydrocarbon feed 10, preferably a desulphurized methane flow, and steam 11 are pre-heated in a heat exchanger 26 and reacted in a primary reformer 12, and optionally pre-reformed in a pre-reformer 12a.

The feed of natural gas 10 and steam 11 is such that the primary reformer 12 is operated with steam-to-carbon ratio lower than 2, as stated in the above disclosure of the invention. For example, feed 11 provides 1.5 moles of steam for each mole of methane in the hydrocarbon feed 10.

A partially reformed gas stream 13, delivered by primary reformer 12 is further treated in a secondary reformer 14. Oxidant is supplied with a stream 15 that may provide excess air, enriched air or substantially pure oxygen, preferably with a purity >95%, according to various embodiments of the invention.

The gas stream 16 from the secondary reformer 14, usually at a temperature around 1000° C., is then cooled in a heat exchanger 17 to 220-320° C. (stream 18), and sent to a medium-temperature shift (MTS) reactor 19.

The MTS reactor 19 is an isothermal catalytic reactor, comprising a copper-based catalytic bed and a plate heat exchanger immersed in the catalytic bed. The inlet and outlet of a cooling medium are shown as 30, 31.

Downstream the MTS reactor 19, the syngas 20 can be further treated in an optional low-temperature shift (LTS) reactor 21, to maximize the conversion of the carbon monoxide into $CO_2$.

The syngas is then further cooled in a heat exchanger 22 and the cooled syngas stream 23 is sent to treatment steps generally denoted by block 24 and including $CO_2$ removal, methanation and optionally cryogenic purification or removal of excess methane by a PSA process. Said cryogenic purification or PSA process may serve to remove unreacted methane in the stream 23, caused by low SC ratio in the primary reformer 12. Nitrogen (stream 32) may be added when necessary to reach the H/N ratio suitable for synthesis of ammonia, in particular when the oxidizer feed 15 is highly enriched air or pure oxygen, i.e. nitrogen in the stream 23 is low. Then the syngas is compressed and sent to an ammonia synthesis loop.

Preferably, all the natural gas feed is supplied to the primary reformer; in another embodiment of the invention (not shown), a portion of the natural gas feedstock may be directed to the secondary reformer.

EXAMPLES

A conventional ammonia plant rated at 1700 MTD (metric tons per day) of ammonia is revamped according to the following embodiments of the invention:
A) reduction of SC ratio in the primary reformer to about 1.5 and installation of a pre-refomer such as 12a in FIG. 1;
B) same as A with further step of providing excess air to the secondary reformer;
C) same as A with further step of providing enriched air to the secondary reformer;
D) same as A with further step of providing pure (>95%) oxygen to the secondary reformer.

The production rate can be increased to 2150 MTD (+26%) in case A; 2200 MTD (+29%) in case B; 2500 MTD (+47%) in case C and 2700 MTD (+59%) in case D.

The specific energy consumption (Gcal per MTD), including energy consumed for air separation and production of oxygen for air enrichment (case C) or pure oxygen feed (case D), is reduced by about 0.1 Gcal/MTD in case A; about 0.2 Gcal/MTD in case B and about 0.5 Gcal/MTD in cases C and D.

The invention claimed is:

1. A process for producing ammonia from an ammonia synthesis gas obtained from a hydrocarbon-containing feedstock, the process comprising the steps of:
pre-reforming said feedstock;
primary reforming all of said feedstock with steam to partially reform said feedstock, wherein said primary reforming is operated with a steam-to-carbon ratio lower than 2;
secondary reforming a partially reformed gas stream delivered from said primary reforming step with an oxidant stream, wherein the ammonia synthesis gas produced by said secondary reforming is directly subject to a medium-temperature shift in a medium-temperature shift reactor over a copper-based catalyst at a temperature between 200 and 350° C. to convert CO into $CO_2$, obtaining a first shifted gas;
purification of the first shifted gas involving at least a further shift conversion of CO to $CO_2$, obtaining a second $CO_2$ containing shifted gas and subsequent removal of carbon dioxide from the second shifted gas, obtaining a purified ammonia synthesis gas, and
reacting the purified ammonia synthesis gas to form ammonia,
wherein the ammonia synthesis gas comprises hydrogen ($H_2$) and nitrogen ($N_2$) in a suitable ratio of about 3:1, and
wherein the overall feedstock required for producing the ammonia synthesis gas according to the process is fed to the pre-reforming step, and said pre-reforming step of said feedstock is carried out before the step of primary reforming.

2. The process according to claim 1, wherein said steam-to-carbon ratio is 1.5 to 2.

3. The process according to claim 1, wherein said oxidant stream is any of air, $O_2$-enriched air or substantially pure oxygen.

4. The process according to claim 1, wherein said medium-temperature shift is carried out in a substantially isothermal condition, by removing heat with a cooling medium.

5. The process according to claim 1, further comprising the step of removing unreacted methane from the synthesis gas by cryogenic separation of methane from the synthesis gas, or by means of a treatment step of adsorption.

6. The process according to claim 1, wherein said steam-to-carbon ratio is 1.5 to 1.7.

7. The process according to claim 1, wherein the unreacted methane is removed from the synthesis gas by pressure swing adsorption.

* * * * *